(12) United States Patent
Agassi et al.

(10) Patent No.: US 6,480,842 B1
(45) Date of Patent: Nov. 12, 2002

(54) DIMENSION TO DOMAIN SERVER

(75) Inventors: Shai Agassi, Los Gatos, CA (US); Luiz Scheinkman, San Jose, CA (US); Hannan Shulman, Ra'anana (IL)

(73) Assignee: SAP Portals, Inc., Palo Alto, CA (US)

( * ) Notice: Subject to any disclaimer, the term of this patent is extended or adjusted under 35 U.S.C. 154(b) by 0 days.

(21) Appl. No.: 09/277,042

(22) Filed: Mar. 25, 1999

Related U.S. Application Data
(60) Provisional application No. 60/079,585, filed on Mar. 26, 1998.

(51) Int. Cl.[7] .......................... G06F 17/30; G06F 17/00
(52) U.S. Cl. .......................................... 707/4; 707/100
(58) Field of Search ................... 707/1–10, 100–104.1, 707/500, 200–206, 526; 709/200–205, 217

(56) References Cited

U.S. PATENT DOCUMENTS 6,006,216 A * 12/1999 Griffin et al. .................. 707/2

* cited by examiner

Primary Examiner—Alford W. Kindred
(74) Attorney, Agent, or Firm—Fidel D. Nwamu; Townsend and Townsend and Crew LLP

(57) ABSTRACT

A system including a method for navigating between dimensions and domains allows for an interactive response to a query based on data stored in at least one online transaction processing (OLTP) database structure and data stored in at least one online analysis processing (OLAP) database structure. The system includes a dimension to domain server which interacts with a user interface client that presents, to a user, representations of elements of the OLTP database structure and representations of elements of the OLAP database structure, wherein the user interface client also includes logic to accept a selection of representations of elements selected by the user and, if the selection comprises more than one element, an association among the elements in the selection. An element relator is provided that relates one or more elements of the OLTP database structure to one or more elements of the OLAP processing database structure when the selection of representations includes at least one element from the OLTP database structure and at least one element from the OLAP database structure. A query formulator, coupled to the user interface client, formulates the query based on the selection and any associations, wherein the query formulator is also coupled to the element relator when at least one association of the selection is an association between at least one element from the OLTP database structure and at least one element the OLAP database structure. A query server receives the query from the query formulator and provides responses to the query received from the query formulator.

14 Claims, 7 Drawing Sheets

FIG. 3A (54)

| Domain_Id | Domain | DatabaseName |
|---|---|---|
| 1 | CUST_COUNTRY | FOODMART |
| 2 | CUST_CITY | FOODMART |

FIG. 3B (52)

| Dimension_Id | Cube | Dlevel | Handle |
|---|---|---|---|
| 1 | Sales | [Customers].[Country] | [Customers].[Country] |
| 2 | Sales | [Customers].[City] | [Customers].[City] |

FIG. 3C (44)

| File_Id | File | DatabaseName | param0 | value0 | param1 | Value1 | param2 | Value2 |
|---|---|---|---|---|---|---|---|---|
| 1 | customer | FOODMART | | | | | | |
| 2 | product_class | FOODMART | | | | | | |

FIG. 3D (42)

| FileToDom_Id | File_Id | Domain_Id | FieldName |
|---|---|---|---|
| 1 | 1 | 1 | country |
| 2 | 2 | 2 | city |

FIG. 3E (46)

| FileToDom_Id | Dimension_Id | Domain_Id | Dom2DimScript | Dom2DimArgs | Dim2DomScript | Dim2DomArgs | Benefit |
|---|---|---|---|---|---|---|---|
| 1 | 1 | 1 | = | [null] | = | [null] | 10 |
| 2 | 2 | 2 | = | [null] | = | [null] | 10 |

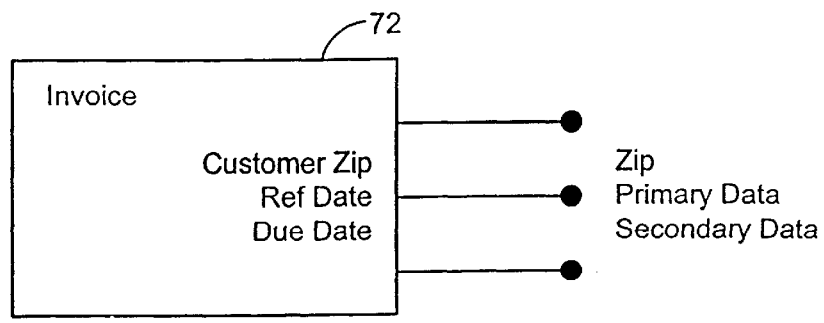
FIG. 4A
FIG. 4B
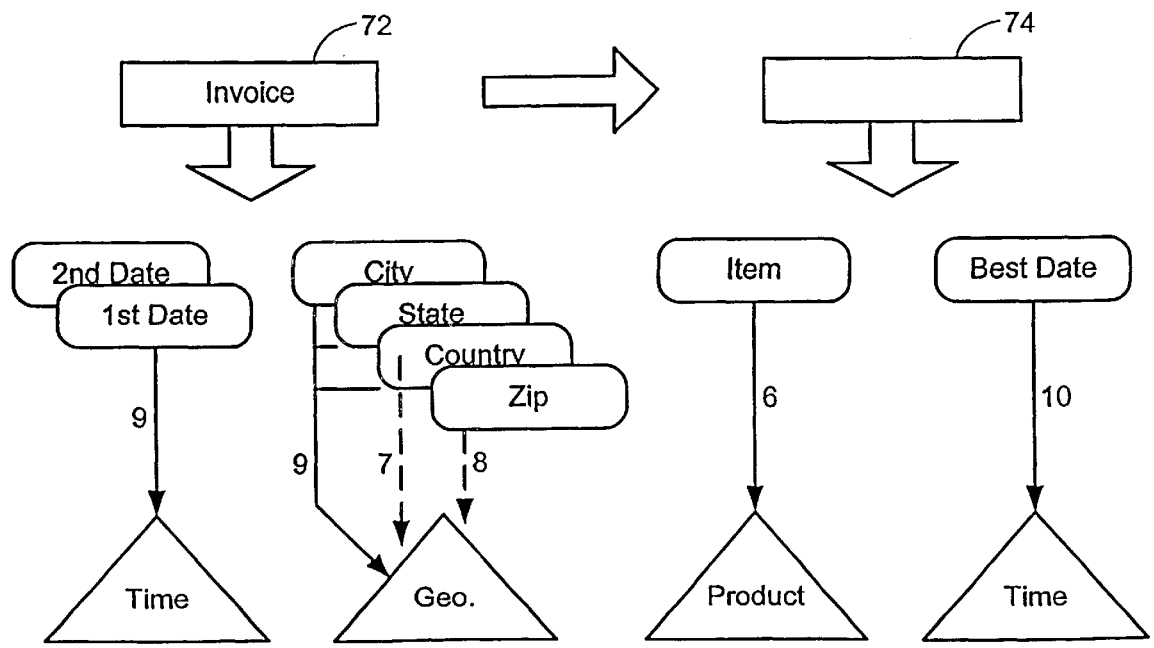
FIG. 5

DIMENSION TO DOMAIN SERVER

CROSS-REFERENCES TO RELATED APPLICATIONS

This application claims priority from U.S. Provisional Application Ser. No. 60/079,585, filed Mar. 26, 1998, the disclosure of which is incorporated herein by reference for all purposes.

BACKGROUND OF THE INVENTION

The present invention relates in general to data processing systems and in particular to data processing systems that allow end users to interactively view various aspects of data stored in the data processing systems.

Conventional relational databases are well-known and data collected in support of large enterprises is often collected into relational databases. For example, an enterprise with a sales operation might store all of their data relating to sales transactions in a relational database. A relational database structure defines the tables making up the relational database, along with definitions for the rows and columns of the tables and the relations between tables.

For example, a relational sales database might have an invoice table and a customer table. The invoice table might have columns for invoice number, customer number, salesperson, sales date, shipping date, etc., with one row per "instance" in the table. In this example, an instance is an invoice. The customer table might have one row per unique customer, and columns for customer number, customer name, address, credit limit, etc. As for the relations between tables, the relational sales database might relate customer number in the invoice table with customer number in the customer table.

Such relational structures are well-known and several methods of navigating large relational databases are known. For example, a user at a relational database client might formulate a Structured Query Language ("SQL") statement and submit that SQL statement to a relational database server. The relational database server would respond to the submission with a table of results that matched the SQL statement. For example, a user might request a list of invoices for a given day, listing the customer, the salesperson and the amount for each such invoice. The list might be informative if the enterprise only makes a few sales per day, but is less likely to be informative if the enterprise makes thousands of sales per day.

To provide knowledge workers with informative views of an enterprise's data, analytical systems are often employed. One example of an analytical system is a data warehouse. A data warehouse contains much the same data as the relational database, but in a much different form. As should be apparent with the examples used above, adding one more invoices to the relational database could be as simple as adding a record with the invoice pertinent data to the invoice table.

For this reason, large relational databases used in this way are often referred to as online transaction processing ("OLTP") systems. By contrast, the data warehouse stores data in aggregate, to allow for high-level analysis of the data. The data is aggregated according to multiple criteria, to provide access to data and aggregations much faster than if the same information were obtained from a relational database system.

Such systems of aggregated data are often referred to as online analytical processing ("OLAP") systems. In a typical enterprise, the data warehouse is populated and updated periodically from the OLTP data. The updating process might, for example, provide invoice totals and other data extracted from the OLTP data to the OLAP data structures on a once-daily update. Using an OLAP system, a user might request a chart of the sales by geographic region broken down by month for a year's worth of data.

If such a request were to be made of the OLTP data structures, a server responding to that request would have to scan all the records in several tables to come up with totals for the chart. With one request, the scan might be easy, but when many, many requests are being made, it is more efficient to make those requests of an OLAP system, since the results for the chart can be obtained by taking the appropriate slice of data from the OLAP data structures. Sometimes, an OLAP data system is represented as a multi-dimensional data structure and each OLAP query is simply a "slice" through this multi-dimensional data structure.

In one common analytical application, a user is presented with a user interface at an OLAP client and uses that OLAP client to "navigate" a set of "cubes" (the multi-dimensional, or "MD" data structure) that were created from the OLTP data structures. Using that OLAP client, the user can navigate the OLAP data using top-down slicing and narrowing mechanisms, looking for points of interest within the information presented. However, since the OLAP data is aggregated data, the user cannot navigate down to individual transactions, if desired.

Another problem with data organized along the OLTP/OLAP lines is that, while relational storage models hold the transactional online data related to everyday operations and MD storage models hold aggregated data used for corporate performance analysis tasks, often information that spans both models is needed.

The user of the data (an end user or an application) is able to query either the relational data or the MD data, but in many cases, the user needs both detailed data from the relational system and related aggregated data from the MD system. For a real-time response, the user would have to access the relational database in real-time and also request that needed aggregations be created in real time.

The creation of these aggregations in real-time would consume large amounts of computing resources and, in many cases, their creation is computationally infeasible. The user could, instead, access the MD system to retrieve pre-calculated aggregations, but then the user would have the aggregated data but not the detailed data.

SUMMARY OF THE INVENTION

A first aspect of the present invention allows for navigation across OLAP and OLTP data structures with a common interface.

For example, a user interface might present a user with draggable user interface elements and drop target elements, where such elements are icons, or the like, and each represent an OLAP element or an OLTP element. In response to the user dragging and dropping, the client generates a query. If both the dragged element and the drop target element are OLAP elements, the client generates an OLAP query.

If both the dragged element and the drop target element are OLTP elements, the client generates an OLTP query. However, if the dragged element is an OLAP element and the drop target element is an OLTP element, or vice versa, the client calls an association server to resolve an association between the elements so that a query can be formulated for an OLAP server and/or an OLTP server.

For example, if an OLAP element is dragged and dropped on an OLTP element, the client queries an association server, or more specifically a dimension-to-domain server (DDS), which responds with an association of the OLAP element to suitable OLTP elements to allow an OLTP query to be generated where a response to such an OLTP query would appear to the user to be responsive to the drag and drop operation.

According to another aspect of the present invention, the DDS comprises translation tables and metadata repositories. Using that information, the DDS can resolve a request for information that spans a relational (OLTP) space and a multi-dimensional (OLAP) space. For example, the DDS can map a given domain and values in that domain in a relational space to dimensions of a cube in a multi-dimensional (MD) space. Given a specific record (or key) in a file, the DDS can map to a list of values onto each dimension of the specified cube. The DDS might also be used to resolve requests in the other direction, such as mapping list of values in an MD space onto each domain in a specified file in a relational space.

In another aspect of the present invention, a distributed query can be processed wherein the distributed query is a query distributed over a relational model and an MD model.

BRIEF DESCRIPTION OF THE DRAWINGS

FIG. 3A is a table showing the data structure of a domain.

FIG. 3B is a table showing the data structure of a dimension.

FIG. 3C is a table showing the data structure of a file.

FIG. 3D is a table showing the data structure of dimension to domain mapping.

FIG. 3E is a table showing the data structure of domain to dimension mapping.

FIG. 4A illustrates an exemplary data representation for an invoice file.

FIG. 4B illustrates a data representation showing interface view of mappings from fields of the invoice file of FIG. 4A to domains.

FIG. 5 is a diagram illustrating a dimension-domain relation process.

Figure 1:
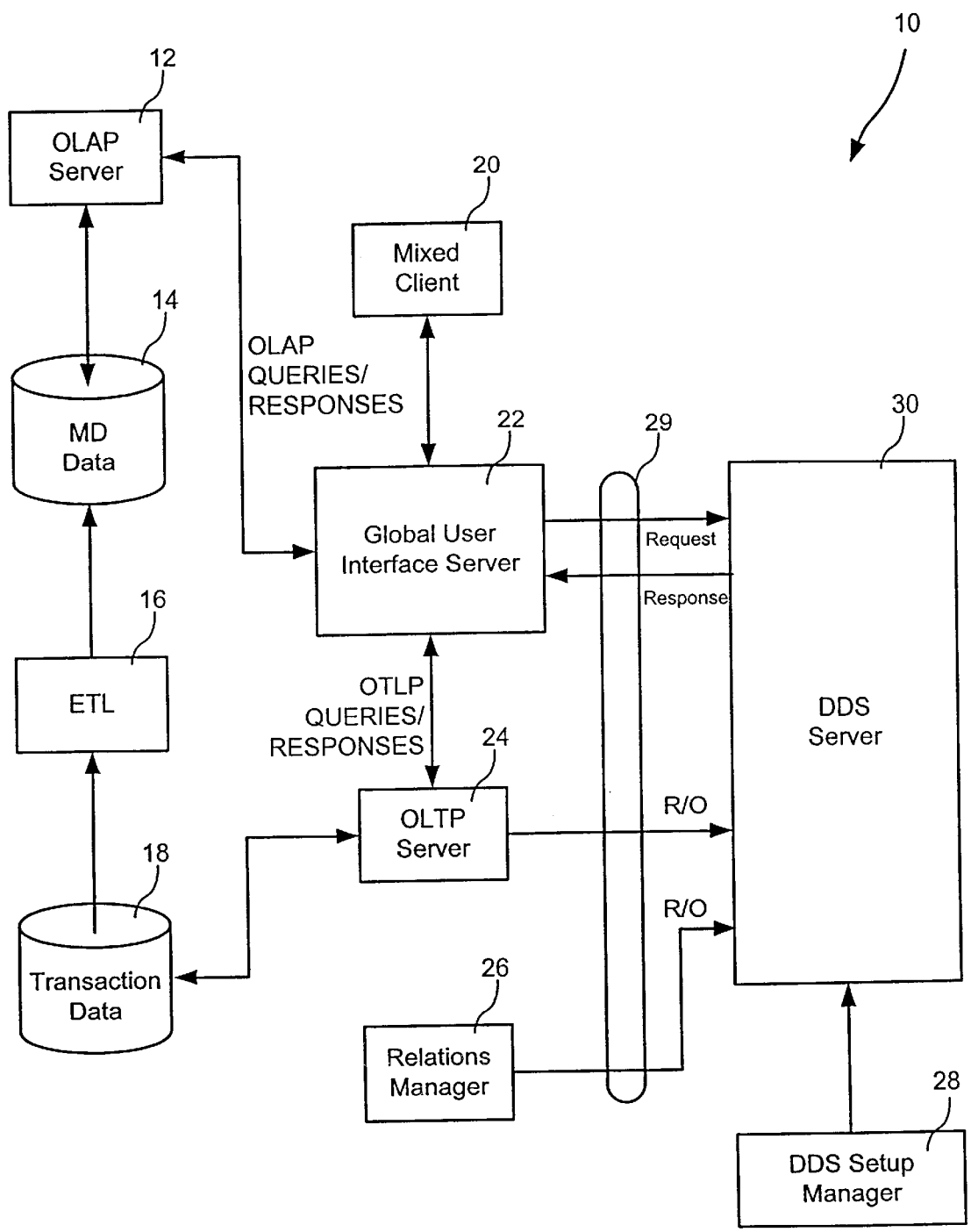
FIG. 1 is a block diagram of a computer system according to one embodiment of the present invention.

A further understanding of the nature and advantages of the present invention herein may be realized by reference to the remaining portions of the specification and the attached drawings. Further features and advantages of the present invention, as well as the structure and operation of various embodiments of the present invention, are described in detail below with respect to the accompanying drawings. In the drawings, the same reference numbers indicate identical or functionally similar elements.

DETAILED DESCRIPTION OF THE INVENTION

Briefly, according to a first embodiment, a relational data structure is organized into files, which are each in turn organized into rows and columns, where the data in a row can be thought of as a transaction or table entry and the columns correspond to fields of data in the row, with each row in the table having the same fields.

A multidimensional data structure is a representation of aggregated data organized along dimensions. Domains are the way a file can relate through to dimensions. Any field in the file can possibly have a domain. A DSS master chooses which fields each file exports, i.e., specifies the domain they represent. This domain is later used to relate to dimensions of cubes. In effect, domains form an interface that files expose to cubes.

FIG. 1 is a block diagram of a computer system 10 according to one embodiment of the present invention.

Among other components, computer system 10 comprises an OLAP (on-line application processing) server 12 for processing and responding to OLAP queries from a global user interface server 22; an MD (multi-dimensional) database 14 for storing multi-dimensional or aggregated data; a system 1 for performing ETL (extraction transformation and loading).

Other components include a transaction database 18 for storing transaction data; a client 20 for requesting OLAP and OLTP (on-line transaction processing) requests and displaying corresponding responses thereof; an OLTP server 24 for processing and responding to OLTP queries from global user interface server 22; a DDI (dimension to domain) interface 29, a drag/drop interface for interfacing with a DDS (dimension to domain) server 30, the server for resolving requests from global user interface 22, the request spanning OLAP and OLTP space to allow an appropriate query to be generated; a relations manager 26; and a DDS manager 28 for managing the setup of DDS server 30.

Although not shown, one of ordinary skill in the art will realize that computer system 10 may be configured in other suitable ways consistent with the spirit and scope of the present invention.

Figure 2:
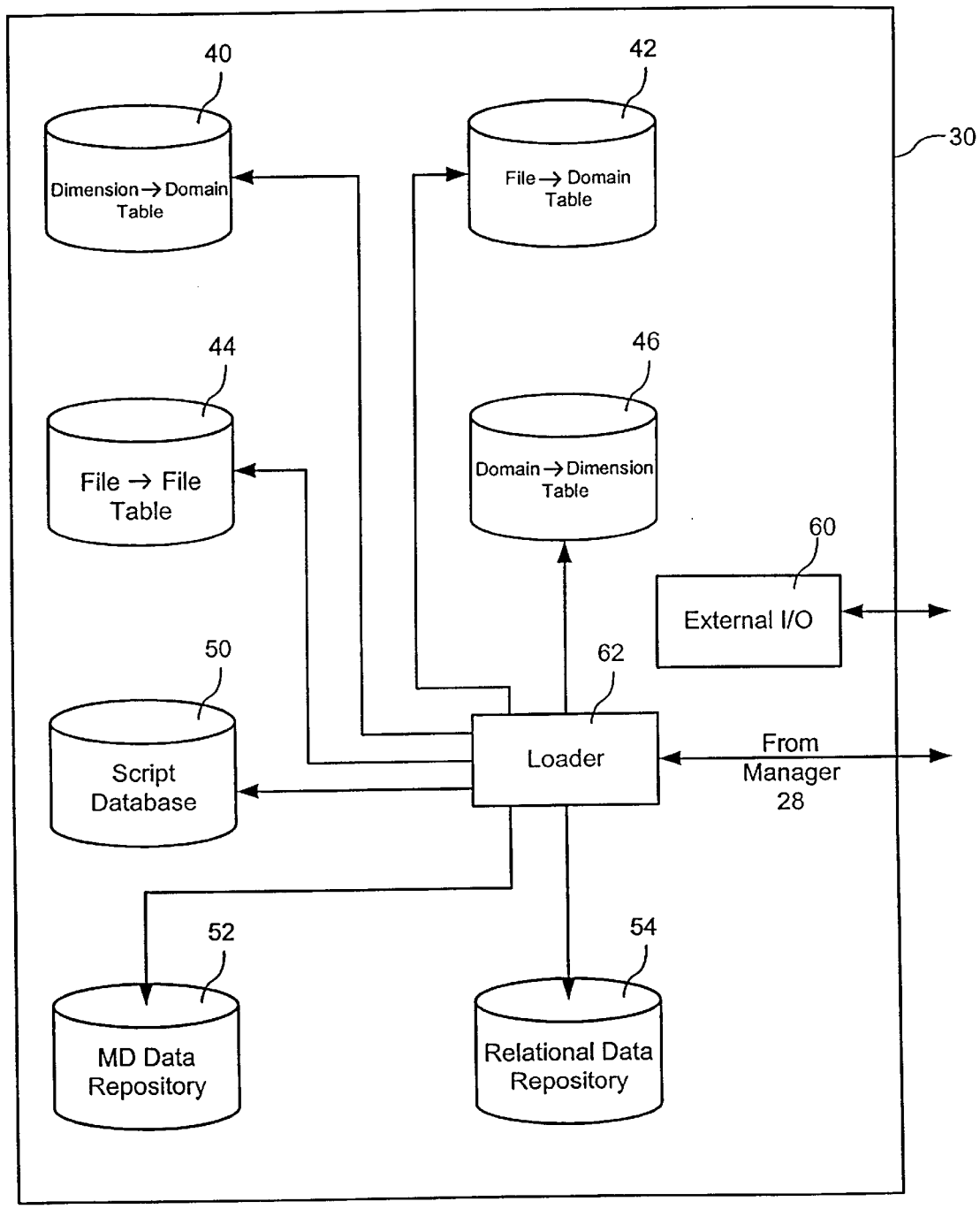
FIG. 2 is a more detailed block diagram of the dimension to domain server shown in FIG. 1.

FIG. 2 is a more detailed block diagram of DDS server 30 of FIG. 1.

Among other components, DDS server 30 comprises a loader 62 for loading data into one or more databases as shown; a repository 54 for storing relational data; a repository 52 for storing multi-dimensional data; a script database 50 for storing scripts describing user-defined functions; a database 44 for storing file to file data structures; a database 40 for storing dimension to domain tables; a database 42 for storing file to domain tables; a database 46 for storing domain to dimension tables; an input/output interface 60; and a loader 62 for interfacing with the aforementioned databases and repositories.

The use of DDS server 30 and other components of computer system 10 is further described with reference to FIG. 3 through FIG. 9.

FIGS. 3A–3E show examples of the tables stored in databases 40 and 44 of FIG. 2.

In FIG. 3A for example, a table 54 showing the data structure of a domain is shown. It should be observed that a given domain can only occur once in the tables. Further, a file cannot export a certain domain more than once. Also note that domains are not obliged to be those defined in the SQL (structured query language) database, though that would be a good start. A DBA (database administrator) can override the SQL definition and give fields special domains. This could be used to give domain-less (in SQL) fields a domain, or to distinguish between fields that have the same domain (in SQL).

In row 1 of FIG. 3A, the domain label is $CUST_{13}$ COUNTRY belonging to a database labeled FOODMART. As shown, FIG. 3B illustrates a dimension table 52 with a Cube labeled Sales, a Domain Level labeled [Customers]. [Country] and a Handle labeled the same. FIG. 3C is a table 44 showing the data structure of a file, FIG. 3D is a table 42 showing the data structure of dimension to domain mapping and FIG. 3E is a table 46 showing the data structure of domain to dimension mapping.

System 10 (FIG. 1) presents the DBA with a display, such as the one shown in FIG. 4A which is a data representation. The display allows the DBA to enter mappings from fields, of each file, to domains.

FIG. 4B shows the interface view of the mappings. As shown, the Customer Zip field is mapped to a domain labeled Zip for later navigating into a dimension.

Referring to FIG. 2, as noted, DDS server 30 includes script repository 50. Script repository 50 holds scripts describing user-defined functions. Scripts are especially formulated to convert from a specific set of domains to a specific dimension so this information is implicitly assumed and not passed as parameter to the functions. The scripts can be code fragments in any suitable language, such as JScript, COM objects code or code in other formats that expose certain interfaces. One example of a script is a COM object written in VBA that exposes a function that receives a person's name and returns his or her initials.

A library of more frequently used scripts can be provided so that the user does not have to define each script, such as scripts to run a SQL statement on look-up tables, scripts for functions that compute arithmetic operations on numeric fields, scripts for functions that map between European and American date formats, and even scripts for the unity function (X→X).

The scripts are set up for use by DDS server 30 by populating a table, such as the one shown as Table 1.

can achieve the same job with only a zip code as parameter (assuming USA as the country). The script f Country relates a country domain to a non-leaf level in the geography hierarchy.

The Benefit column (marked B) is used to give precedence to one conversion over another. Different conversions to the same dimension must not have the same benefit set to them. In the above example, since f Address has precedence over f ZipToAddress, if DDS server 30 receives Country, State, City and Zip domains, it will choose to convert to the Country.State.City through the f Address function (using the Country, State and City domains and not the Zip domain).

Typically, there is no direct relation between files in the relational space and dimensions in the OLAP space and the two only relate through domains. Using its domain-to-dimension table 46 and file-to-domain table 42, DDS server 30 can construct a table that depicts those indirect relations. This is shown as file-to-file table 44 in FIG. 2. Using file-to-file table 44, DDS server 30 determines which file any given file relates to, as a function of the dimension it ultimately wants to relate to. An example of file-to-file table 40 is provided as Table 2.

TABLE 2

|  | Dimension | | |
| --- | --- | --- | --- |
| File | Time | Geography | Product |
| Invoice | <domains> | <domains> | ITEM, 1 |
| Item | <no relation> | <no relation> | <domains> |

The<domains>label denotes that there is a relation between the file to the dimension through that file's domains. An example is the Primary Date domain of the invoice that relates to the Year.Qtr.Month.Day hierarchy of the Time dimension. Files that have no relation (through their domains) to a certain dimension can still relate to it by first relating to a file that does relate to this dimension. The Invoice file in the example of FIG. 4(a) above is specified as a relative of Product (using relation number 1) when trying to relate to the Product dimension.

Preferably, DDS server 30 is not constrained to follow any file-to-file relation descriptions. This job is preferably

TABLE 1

| Dimension | Hierarchy | Domains | Script | P | Script | P | B |
| --- | --- | --- | --- | --- | --- | --- | --- |
| Time | Year.Qtr.Month.Day | Primary Date | fDate | A | gDate | A | 9 |
| Time | Year.Week | Primary Date | fDateToWeek |  | gWeekToDate |  | 4 |
| Geography | Country.State.City | Country, State, City | fAddress |  | gAddress |  | 9 |
| Geography | Country.State.City | Zip | fZipToAddress |  | gAddressToZip |  | 8 |
| Geography | Country | Country | fCountry |  | gCountry |  | 7 |

In Table 1, the script label Date might refer to a script that breaks a date (e.g., Dec. 31, 1998) to its components (1998, Q4, 12, 31). In Table 1, there are columns for two scripts, one for each conversion direction, and their associated parameters (labeled "P"). The parameter value "A" for the script f Date is passed to the script when it executes. In this case, that parameter indicates that the date is to be interpreted as a date in American format. The script gDate performs the inverse conversion of the f Date script. The scripts f DateToWeek and gWeekToDate are similar, except that they map between a date in a year to a week number of that year.

The script f address takes three domains together and combines them to a dimension. The script f ZipToAddress reserved to relation manager component (RMC). The RMC must know how to answer questions of the sort: "For record X of File A, what are the related records of file B?" DDS server 30 will communicate with this component (through a standardized interface—RMI) to extract the information it needs. DDS server 30 stores which relation to use though, as there could be more than one between a pair of files. The RMC is implementable over a server relation engine.

In some embodiments, the file-to-file table is populated by an auto-completion process as shown in U.S. application No. 09/276,182, filed of even date with this application, the disclosure of which is incorporated by reference herein for all purposes.

Referring to FIG. 1, in use for resolving process, client 20 views a multi-dimensional component and drags a cell or bar from an OLAP data view onto an icon or other drop target representing a relational component. In response, client 20 generates a request based on the dragged item and the drop target. Since an MD to relational mapping is needed, DDS server 30 resolves the query using metadata repository entries and generates a SQL/MDX request. When the data is returned from the respective server, an HTML page (or other format page) is generated for client 20. Where the user moves in the other direction, from relational to MD, client 20 is typically viewing a display of transactions and drags a property into a view component, where the view component is an MD element. The resulting map from the transactional space to the MD space is done and resolved. The SQL/MDX is generated and the resulting view is presented to the user with the relevant dimensions highlighted.

FIG. 5 illustrates a relation network for file-to-domain table 42, domain-to-dimension table 46 and file-to-file table 44 used by DDS server 30. In FIG. 5, an example wherein DDS server 30 receives a request to map an invoice 72 onto the MD space is illustrated. DDS server 30 finds the most "beneficial" paths to every possible dimension, using the "benefit" values and relates through them in the following steps:

1) Invoice 72 is directly related to Time through the Primary Date domain with benefit of 9. DDS server 30 will not even consider the path that relates to Item first and then follows its Best Date domain to the Time dimension, even if its benefit is higher, because the file-to-file table specifies that Time dimension should be related through the internal domains of Invoice;
2) The Geography dimension will be related to through the City, State and Country domains, but not through the Country or Zip domains because the benefit for doing the former (9) is higher than doing any of the latter (7 or 8 respectively);
3) Since the file-to-file table specifies that the way to relate to the Product dimension is through the Item domain of the Item file, DDS server 30 does so in the most beneficial way it can. In this case, there is only one possible way.

The benefits of file-to-domain and file-to-file conversions are constant and assumed to be zero. Benefits are used to give precedence to one domain over another when converting to a dimension. In FIG. 5, the domains that are used to relate to dimensions are shown with bolded borders and the "related-to" dimensions are shown as bolded triangles. In FIG. 5, solid arrows denote the relations actually used and dashed arrows denote alternative relations that were not used. Resolving the mapping of dimensions back to domains is done in a similar way. The most beneficial path from the source dimension to the target file is located and traversed in the opposite direction.

Figure 6:
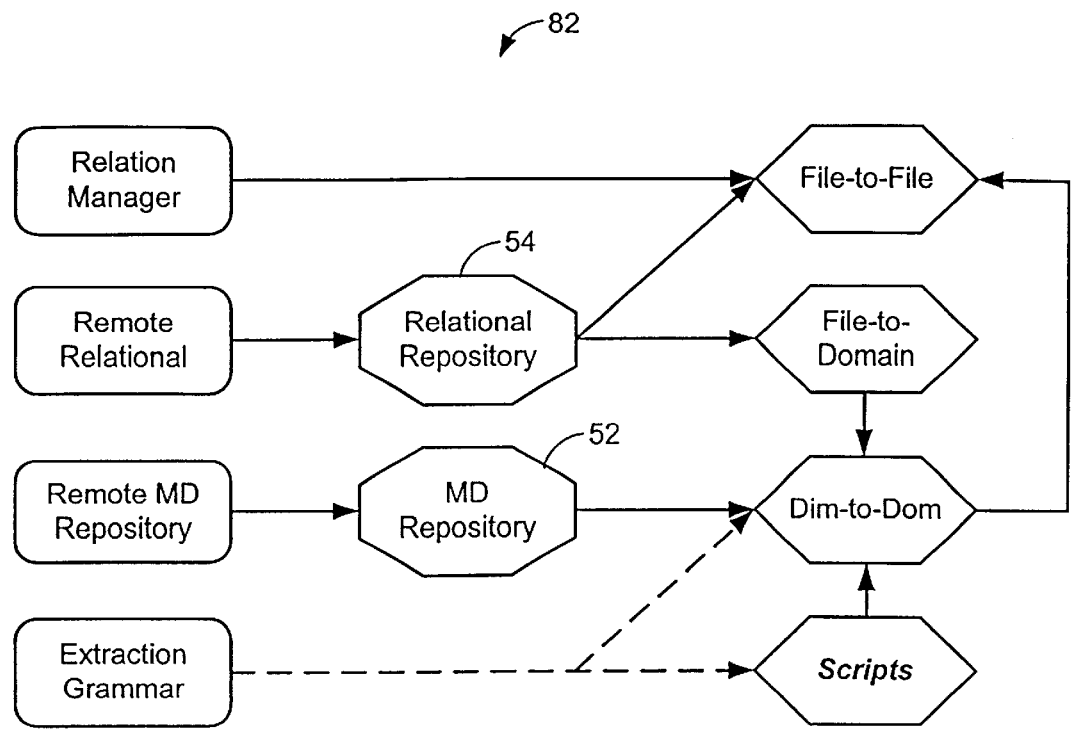
FIG. 6 is an exemplary setup wizard interface through which a dimension to domain server accesses its internal repositories.
Figure 7:
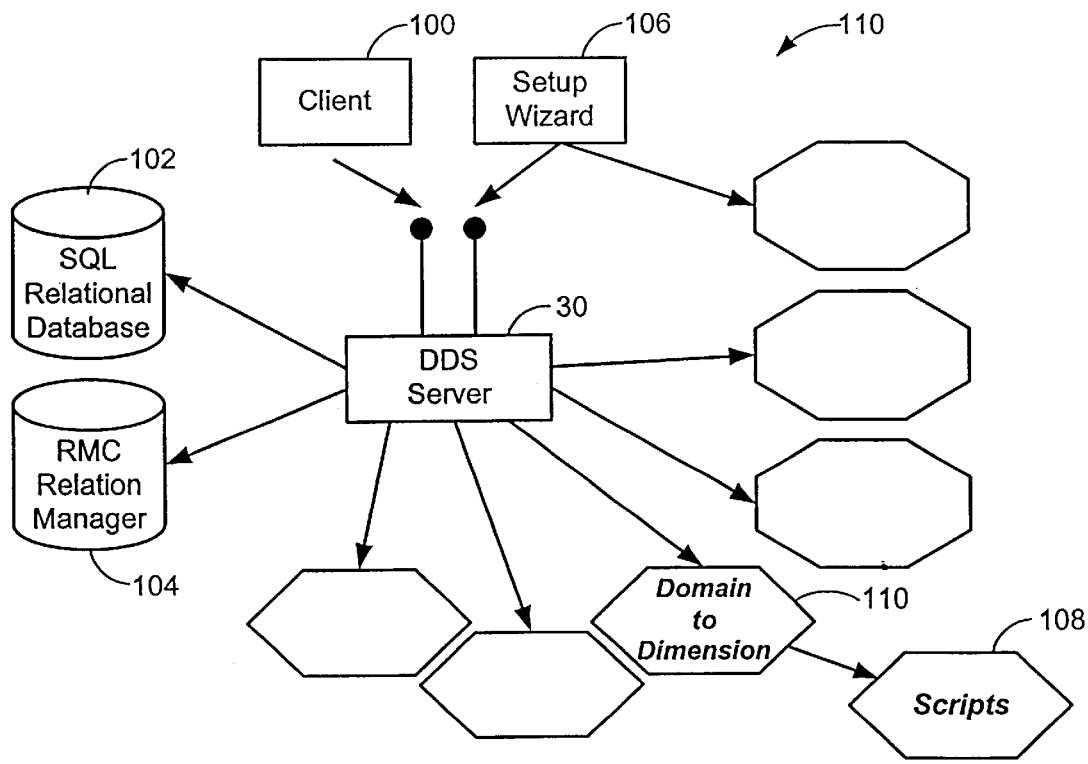
FIG. 7 illustrates further elements of the systems described in FIGS. 1–5.

Referring to FIGS. 6 and 7, DDS server 30 is a server, in that it accepts requests from client 100 and returns results to client 100. This interaction can be done through a COM interface DDI 29 exposed by DDS server 30. DDS server 30 includes several internal data structures, shown in FIG. 2. These structures are built off-line when DDS server 30 is set-up and might be updated each time new data is extracted from a relational database to an MD database. DDS server 30 also has interfaces to external sources, which DDS server 30 accesses on a read-only basis. Those external sources include a SQL interface to the relational database and the relation manager.

During setup, DDS server 30's internal data structures are built and its connection to the SQL server and relation manager is established. During setup, the relation network is created. This process is done semi-automatically by setup wizard 106 and then is fine-tuned by the DBA. Scripts 108 are also assigned to each domain-to-dimension conversion 110. Setup also includes setting up the connection between DDS server 30 and the remote SQL server and the connection between DDS server 30 and the RMC relational manager 104. It should be noted that a local subset of the relational data repository 54 and MD data repository 52 might be cached locally during setup. The setup can be performed using DDS setup wizard 106, which automatically sets up as much as possible and to provide a friendly user interface for the DBA to handle other items.

In some cases, the initial setup might need to be redone, such as when the underlying remote repositories change or when the relation network needs to be altered. To save the DBA from redoing all of the fine tuning again, the setup wizard 106 keeps a setup log of all previous changes. This log file can serve as input to consecutive setup sessions.

DDS server 30 will access its internal repositories through the setup wizard interface SWI 82 that DDS server 30 exposes specifically for that reason. An example of SWI 82 is shown in FIG. 6. Since DDS server 30 coordinates between two dynamic databases, it must be able to tell if either of them was altered. For that reason, DDS server 30 will access the remote repositories on startup and compare them to its local copies, prompting the DBA if a difference was found.

Running DDS server 30 mandates the DBA to provide certain services, such as access to the relational database, namely running SQL queries, in run time, and access to the RMC, in run time. As mentioned earlier this interface must be able to answer "what are the related records of file B, for record X of File A?" Access to relational data repository 54 also needs to be provided for extracting a list of all domains during initial setup, as well as access to the MD data repository 54 for extracting a list of hierarchies.

Using this DDS approach, a resolution mechanism for requests resulting from a navigational user experience is provided that connects dissimilar models of information. The first model is the relational, or transactional, model. In it information is stored in tables, columns and records. It is mainly used to store high granularity information about individual transactions occurring in the normal conduct of business. The second model is the Multi-Dimensional (MD) storage model. It is usually used to store highly aggregated information using multiple dimensions (DIMs) of characterization on few measurements. MD information is stored in a form called cubes, and serves mainly the need for analytical view through low granularity of aggregated data.

Although MD information usually results from a process called Extraction Transformation and Loading (ETL) on transactional data from relational databases, most analytical environments relying on MD information are completely disconnected at the user level from the related transactional data that created it. With this DDS approach, a user can use closed-loop analysis to navigate through the data. DDS server 30 creates a complete relationship model, spanning the two models.

Figure 8:
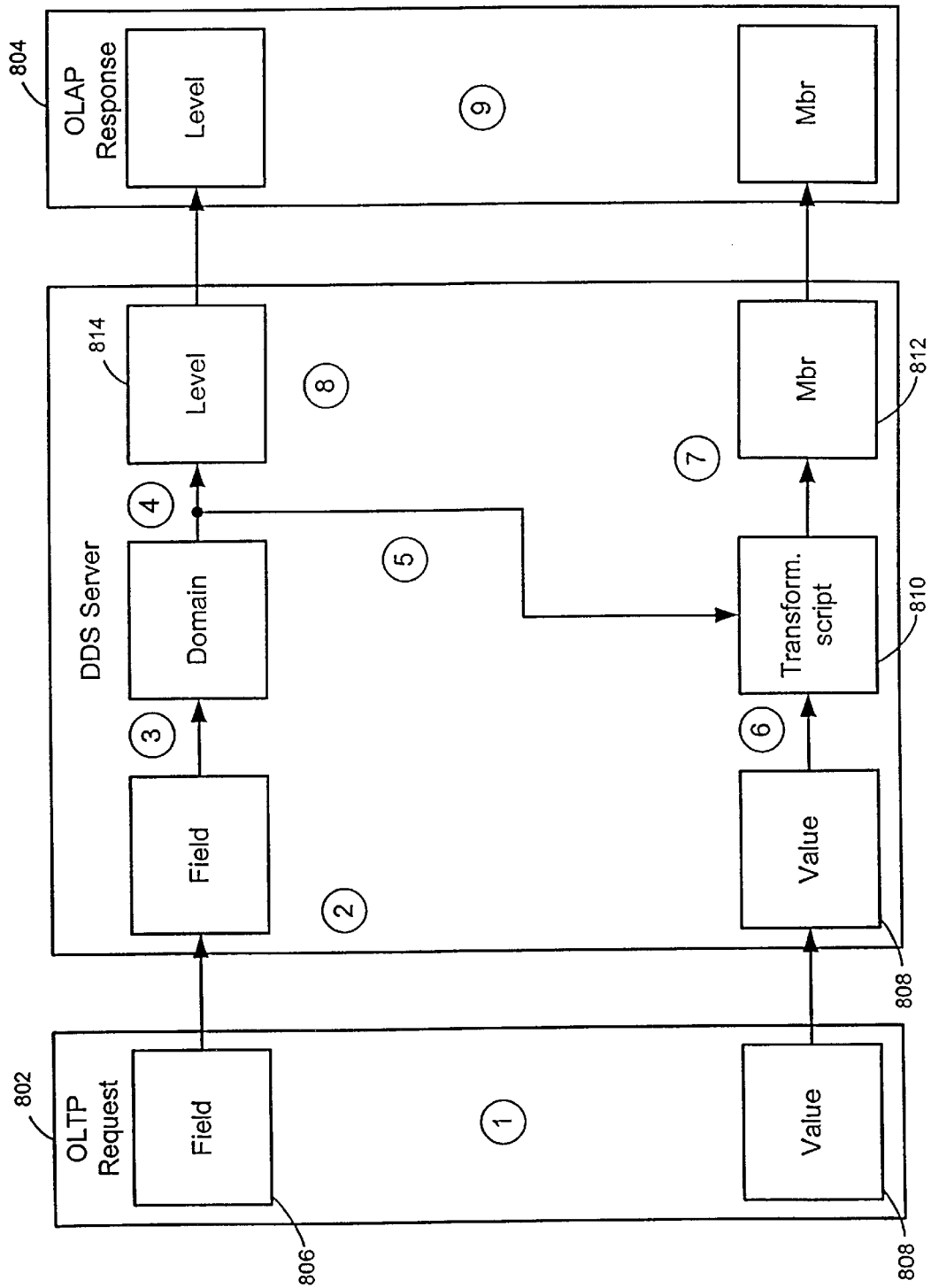
FIG. 8 illustrates a process for translating an OLTP (online transaction processing) request into an OLAP (online analytical processing) response.

FIG. 8 illustrates a process for translating an OLTP request into an OLAP response. The first step is to provide DDS server 30 with the field and a value from the OLTP request (1, 2). From the field and its internal tables, DDS server 30 finds the appropriate domain of the field (3) and DDS server 30 finds the OLAP level that correlates with the domain (4). DDS server 30 also finds the necessary transformation script for this domain-to-level correlation (5).

The value from the request is sent as a parameter to the transformation script (6). The result of the script is an OLAP member code (7). That member code and level (from step 4) are returned from DDS server 30 as the OLAP response (8), which can then be passed as a parameter to an OLAP view and used as a constraint thereon.

When dragging an OLTP data icon into an OLAP view, DDS server 30 will try to translate the OLTP data into an OLAP constraint based on the information stored in the repositories within DDS server 30. For example, the HRNP (HyperRelational Network Protocol) mixed OLAP/OLTP URL for an event might be:

Hrnp://127.0.01:9999/OLAPView/1018<127.0.0.1:9999/CUST/country/USA which represents the action of dragging an icon representing OLTP data for "Customer Country" ("CUST/country", "127.0.0.1:9999/CUST/country/USA") into the predefined OLAP view "1018" representing "Profit By Store over Customers". DDS server 30 will try to convert the field "Customer Country" into a dimension and level used by the view. It will also translate the field value ("USA") to a member name ("USA") in that level ("[Customers].[Country]").

Specifically, what happens is that DDS server 30 parses the URL and looks for a domain that can represent the "Customer Country". This can be done by getting the file from the URL ("customer") and getting the domain from for the field "country" ("$CUST_{13}$ COUNTRY"). Then, DDS server 30 obtains the dimension and level mapped to that domain ("[Customers].[Country]") and calls the script that converts from domain "$CUST_{13}$ COUNTRY" to level "[Customers].[Country].[Country]"("=", "USA). From this information, DDS server 30 can build the OLAP DATA URL:

127.0.0.1:9999/$OLAPDATA$1018/[Sales]/[Customers].[Country]=[Customers].[USA]

To make an HRNP pure OLAP URL, "Hrnp://" is appended to the above URL.

For OLAP-to-OLTP conversion, such as when a user drags an OLAP data icon into an OLTP view, DDS server 30 will try to translate the OLAP data into an OLTP constraint based on the information stored in the repositories. For example, the HRNP (HyperRelational Network Protocol) mixed OLTP/OLAP URL for an event might be:

hrnp://127.0.0.1:9999/Action/1001<127.0.0.1:9999/$OLAPDATA$1022/[sales]/[customers].[Country]=[customers].[All Customers].[USA]

This represents the action of dragging an icon representing the OLAP data of the "Customer Country" ("[customers].[Country]")

"127.0.0.1:9999/$OLAPDATA$1022/[sales]/[customers].[Country]=[customers].[All Customers].[USA]" into a predefined OLTP view "1001" representing "Customers". DDS server 30 will try to convert the dimension level "Customer Country" into a domain used by the main file of the OLTP view "1001", in this case the file "CUST_COUNTRY".

Specifically, what happens is that DDS server 30 parses the URL and looks for the dimension and level ("[Customers].[Country]") and obtains the domain that is mapped to this level ("CUST_COUNTRY"). The DSS then calls the script that converts the member from the level "[Customers].[Country]" to the domain "CUST_COUNTRY"("=", "USA"). The DSS then builds the corresponding OLTP URL:

127.0.0.1:9999/CUST/country/USA

To make an HRNP pure OLAP URL, "Hrnp://" is appended to the above URL.

Figure 9:
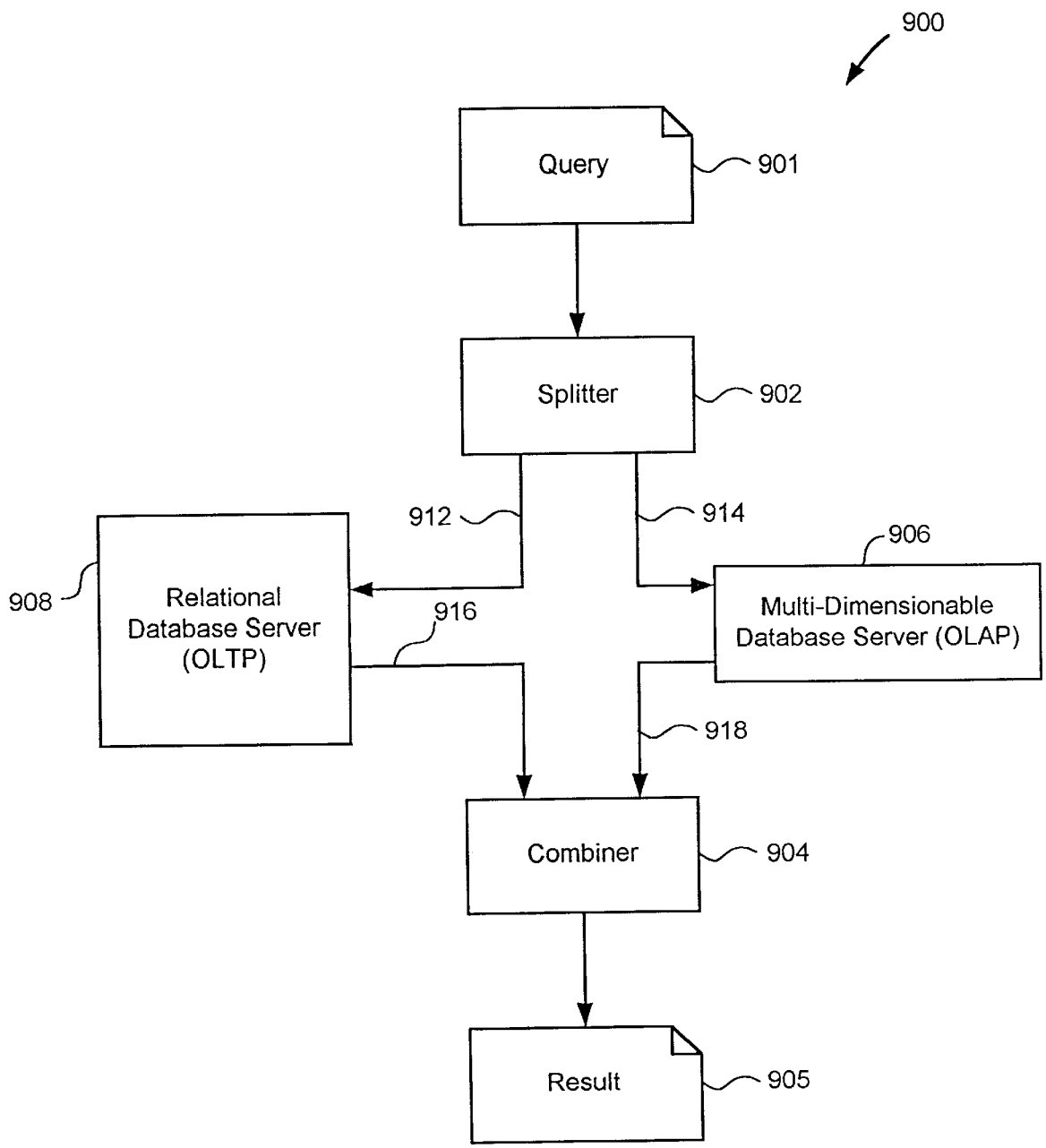
FIG. 9 is an exemplary block diagram for handling a distributed query having both relational data and MD data.

In a variation of the above-described system, a query can be presented to the system that is a distributed query in that it involves both relational data and MD data. To handle such queries, global user interface server 22 shown in FIG. 1 might include a submodule 900 for query parsing as shown in FIG. 9. Submodule 900 is shown comprising a splitter 902 that splits a distributed query 901 into a relational portion and an MD portion 914.

The relational portion 912 is provided to relational database server (OLTP server 24) as a relational query and a relational query result 916 is provided by the relational database server. The MD portion 914 is provided to the MD database server (OLAP server 12) as an MD query and an MD query result 918 is provided by the MD database server. These two results are provided to a combiner 904, which combines the results into a single query result 905 responsive to the distributed query 901.

Submodule 900 uses DDS server 30 to obtain information about the relationships between relational data and MD data and is thus able to get a request for data (e.g., a query such as an SQL statement) that asks for both detailed data and aggregated data and return a result. Submodule 900 does this by splitting the request into the relational portion (a query for detailed OLTP data) and an MD portion (a query for aggregate OLAP data). Combiner 904 combines the two results and presents the combined results to the user in a coherent manner.

The various DDS server 30 repositories hold information about the mapping between the data in the relational database and data in the MD database, as well as information about the transformations that are required for the mapping. When a request for data is received, submodule 900 parses it to determine if it contains any requests for aggregated data. If there are such requests, submodule 900 queries DDS server 30 to determine if the requested aggregation exists in the MD database. If DDS server 30 finds a corresponding aggregation in the MD database, an MD request is formatted. Submodule 900 then modifies the original request to remove the aggregate portion and sends the modified request to the relational database. The aggregation request is sent to the MD database. The results of the aggregation query are then combined with the related relational query results into one result set that will be presented to the user.

In this fashion, the present invention provides a dimension to domain server system. While the above is a complete description of exemplary specific embodiments of the invention, additional embodiments are also possible. Thus, the above description should not be taken as limiting the scope of the invention, which is defined by the appended claims along with their full scope of equivalents.

What is claimed is:

1. An apparatus for providing an interactive response to a query based on data stored in at least one online transaction processing (OLTP) database structure and data stored in at least one online analysis processing (OLAP) database structure, the apparatus comprising:

a user interface client that presents, to a user, representations of elements of the OLTP database structure and representations of elements of the OLAP database structure, wherein the user interface client also includes logic to accept a selection of representations of elements selected by the user and, if the selection comprises more than one element, an association among the elements in the selection;

an element relator that relates one or more elements of the OLTP database structure to one or more elements of the OLAP database structure when the selection of representations includes at least one element from the OLTP database structure and at least one element from the OLAP database structure;

a query formulator, coupled to the user interface client, for formulating the query based on the selection and any associations, wherein the query formulator is also coupled to the element relator when at least one association of the selection is an association between at least one element from the OLTP database structure and at least one element the OLAP database structure; and a query server, coupled to receive the query from the query formulator, wherein the query server provides responses to the query received from the query formulator.

2. The apparatus of claim 1, wherein the user interface client includes:

logic for accepting a dragged user interface element and a drop target; and logic for associating the element represented by the dragged user interface element and the element represented by the drop target.

3. A client-server computer system for providing an interactive response to a query based on data stored in at least one online transaction processing (OLTP) database structure and data stored in at least one online analysis processing (OLAP) database structure, the apparatus comprising:

a client comprising:
  a) interface logic to present representations of elements of the OLTP database structure and representations of elements of the OLAP database structure to a user; and
  b) query acceptance logic to accept a selection of representations of elements selected by the user and, if the selection comprises more than one element, an association among the elements in the selection;

an association server, coupled to receive the selection from the client when the selection includes at least one element of the OLTP database structure and at least one element of the OLAP processing database structure, the association server including logic to provide a response indicating an association between the selection elements received;

an OLTP server, coupled to receive an OLTP query comprising OLTP elements of the selection and OLTP associations returned in the response from the association server, if any, including logic for generating a response to the OLTP query; and an OLAP server, coupled to receive an OLAP query comprising OLAP elements of the selection and OLAP associations returned in the response from the association server, if any, including logic for generating a response to the OLAP query.

4. A relation server comprising:

a dimension-to-domain translation table;

a file-to-domain translation table;

one or more software instructions for receiving a relation request comprising at least one online analysis processing (OLAP) database element and at least one online transaction processing (OLTP) database element; and one or more software instructions employing any one or more of the dimension-to-domain translation table and the file-to-domain translation table for providing an association between the received OLAP database element and the received OLTP database element.

5. The relation server of claim 4 further comprising a file-to-file translation table.

6. The relation server of claim 5 further comprising a domain-to-dimension translation table.

7. The relation server of claim 6 further comprising an OLAP data repository.

8. The relation server of claim 7 further comprising an OLTP data repository.

9. A method by a computer system for navigating in real-time from an OLTP (online transaction processing) database structure into an OLAP (online analysis processing) database structure and from the OLAP database structure into an OLTP database structure, the method comprising:

receiving by the computer system a query for information spanning both the OLTP database structure and the OLAP database structure;

in real-time and responsive to the query, transforming at least one OLTP database structure element into at least one OLAP database structure element; and transforming in real-time at least one OLAP database structure element into at least one OLTP database structure element.

10. The method of claim 9 further comprising providing mappings between the at least one OLTP database structure element and the at least one OLAP database structure element.

11. The method of claim 10 wherein the acts of transforming are performed using the mappings.

12. The method of claim 9 wherein the computer system is a client/server computer system.

13. The method of claim 9 wherein the query further comprises a representation of an OLAP database structure element and a representation of an OLTP database structure element.

14. The method of claim 13 further comprising providing a response to the query indicating an association between the representation of an OLAP database structure element and a representation of an OLTP database structure element.

* * * * *